July 21, 1964
A. C. SCINTA
3,141,186
WINDSHIELD WIPER
Filed Sept. 11, 1961
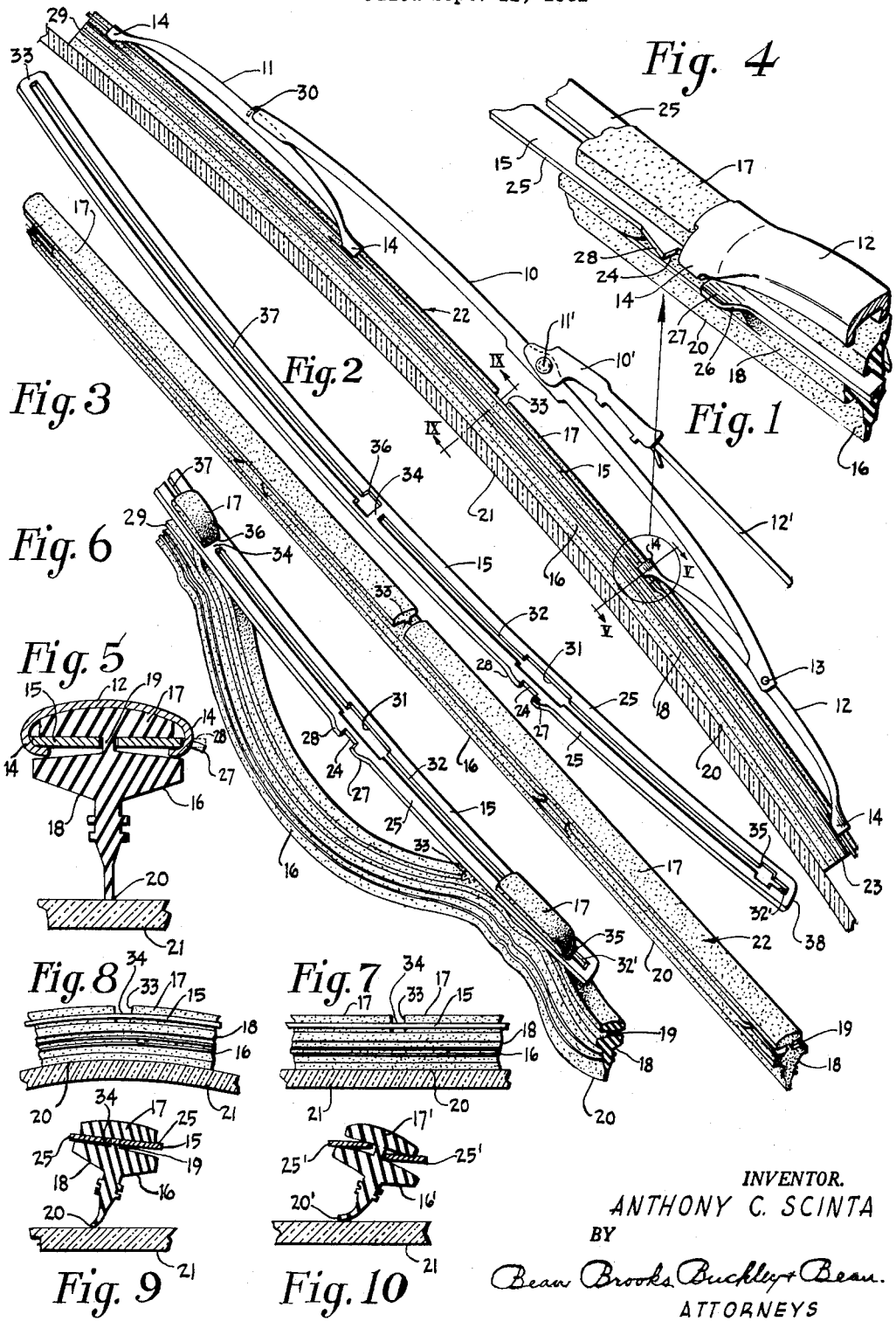
INVENTOR.
ANTHONY C. SCINTA
BY
Bean Brooks Buckley + Bean
ATTORNEYS

3,141,186
WINDSHIELD WIPER
Anthony C. Scinta, Hamburg, N.Y., assignor to Trico
  Products Corporation, Buffalo, N.Y.
Filed Sept. 11, 1961, Ser. No. 137,210
6 Claims. (Cl. 15—250.42)

The present invention relates to an improved windshield wiper for curved windshields and to an improved refill unit therefor.

It is an object of the present invention to provide an improved windshield wiper for a curved windshield consisting of a superstructure mounting a replaceable refill unit consisting of an improved backing strip and an improved wiping element. A related object of the present invention is to provide an improved wiper element which is cut away at certain select portions thereof and is therefore capable of providing increased flexibility at said certain select portions to permit it to conform more readily to areas of various curvature on a curved windshield. A further related object of the present invention is to provide an improved backing strip for mounting the above-mentioned wiping element, the backing strip stabilizing the wiper element in the portion thereof which is cut away to thereby enhance the wiping engagement with a windshield without diminishing the increased flexibility due to said cut away portion.

A further object of the present invention is to provide a wiper refill unit consisting of a wiping element and a backing strip of the above-mentioned types wherein the backing strip is fabricated in such a manner so as to lend stability to the wiping element while in no way detracting from the increased flexibility thereof, thereby providing a refill unit which not only produces improved windshield conforming action due to its increased flexibility but also provides improved wiping engagement with the windshield due to the stabilizing effect produced by said improved backing strip.

Yet another object of the present invention is to provide a backing strip for a windshield wiper which can be fabricated by a simple punching technique.

Still another object of the present invention is to provide a refill unit for a windshield wiper consisting of a wiping element and a backing strip which can be inserted in a superstructure in a very simple manner to provide positive locking engagement with portions of said superstructure, but can be removed from said superstructure without tools by merely twisting the refill unit in a direction substantially perpendicular to its longitudinal axis. Other objects and attendant advantages will readily be perceived hereafter.

The present invention relates to an improved curved windshield wiper having a superstructure and a refill unit therefor consisting of a backing strip and a wiping element. The wiping element consists of a central body portion with a wiping lip attached thereto and a head portion attached to the central body portion by means of a neck. The neck fits in a longitudinal slot in the backing strip and the head portion is supported by side rails on opposite sides of the slot. At the central area of the wiping element the head portion, noted above, is discontinuous, or cut away, so as to cause the wiper element to be more flexible in said central area. The cut away portion provides less resistance to flexing of the wiper element than if the wiper element were not cut away. However, to insure that the wiping lip in the vicinity of the more flexible central portion of the wiping element which is cut away provides good surface engagement with the windshield, notwithstanding its increased flexibility, the backing strip has a cross brace formed integrally therewith which connects the opposite side rails. The cross brace prevents relative movement between the side rails which it connects and thus stabilizes the backing strip in this region. However, the cross brace does not make the backing strip substantially more rigid in a direction perpendicular to the windshield in the region where it is located. Thus the combined wiper element and backing strip provide a net increase in flexibility at the central portion thereof, to enhance good surface conformance, while the backing strip also stabilizes the wiper element and thus causes it to remain in firm engagement with the windshield, thereby enhancing the wipe characteristics provided thereby. All portions of the backing strip lie in substantially the same plane, thereby permitting its fabrication by a single punching technique. Furthermore, the backing strip noted above has a notch formed therein which extends laterally from the outer edge thereof. This notch is located intermediate the end portions of the backing strip and is intended to engage an intermediate claw, or the like, of the superstructure. It will readily be seen that if for some unexpected reason there is disengagement between the notch and the intermediate claw, the fact remains that the notch must move past an adjacent claw before it can be released from the superstructure. This precludes the backing strip and wiping element from being inadvertently separated from the superstructure. If it is desired to intentionally disengage the refill unit from the superstructure, it is merely necessary to apply a manual twisting force at the notch in a direction which is substantially perpendicular to the longitudinal axis of the refill unit. Thereafter the refill unit can be slid from the superstructure for replacement purposes. The present invention will be more fully understood when the following portions of the specification are read in conjunction with the accompanying drawings wherein:

FIG. 1 is a side elevational view of the improved wiper of the present invention mounted on a curved windshield;

FIG. 2 is a perspective view of the improved backing strip of the present invention;

FIG. 3 is a perspective view of the improved wiping element;

FIG. 4 is an enlarged fragmentary perspective view showing the manner in which the backing strip is attached to a yoke of the superstructure;

FIG. 5 is a cross sectional view taken along line V—V of FIG. 1 and showing the manner in which the backing strip is locked to the superstructure;

FIG. 6 is a fragmentary perspective view showing the manner in which the wiping element is assembled onto the backing strip;

FIG. 7 is a side elevational view showing the position which the wiping element assumes on the relatively flat portion of the windshield;

FIG. 8 is a side elevational view showing the position which the wiping element assumes on the more curved portions of the windshield;

FIG. 9 is a cross sectional view taken along line IX—IX of FIG. 1 showing how the cross brace of the backing strip stabilizes the wiping element; and FIG. 10 is a cross sectional view of a conventional backing strip which is not stabilized by the cross brace depicted in FIGS. 2 and 9.

In FIG. 1 a windshield wiper is shown having a primary yoke 10 and a plurality of pressure equalizers 11 and 12 pivotally mounted on the outer ends thereof. The manner of attaching the pressure equalizers to the primary yokes may be in accordance with the teaching set forth in the patent to John R. Oishei, No. 2,667,656, and by itself forms no part of the present invention. Other forms of detachable connections between one or both of the pressure equalizers and the primary yoke may be provided. Preferably, however, the pressure equalizer is pivotally secured to the lower end of primary yoke 10 by a rivet 13 or the like to form a permanent rockable connection. As is well understood in the art, a clip 10' is pivotally secured to the central portion of yoke 10 by rivet 11'. Clip 10' receives the outer end of a wiper arm 12' in the manner fully set forth in Patent No. 2,807,822 issued to Anthony C. Scinta, this particular arrangement forming no part of the present invention, as it will be understood that any type of connection between the end of the wiper arm and the clip attached to the blade may be utilized.

The outer ends of each of the pressure equalizers are bent to form claws 14 for receiving the backing strip 15 which mounts the wiping element 16. The wiping element includes a head portion 17 which is connected to a central body portion 18 by a neck 19. The central body portion has a wiping lip 20 attached thereto for wiping engagement with a windshield 21. The claws 14 slidably embrace the backing strip to permit the wiping element 16 and the backing strip 15, which jointly comprise a refill unit 22, to conform to various areas of a curved windshield.

In order to mount the refill unit 22 on the superstructure, it is only necessary to disengage pressure equalizer 11 from yoke 10. Thereafter the end 23 (Fig. 2) is slid into the inner set of claws 14 of pressure equalizer 12 and moved lengthwise thereof until it is seated within the outer set of claws 14. At such time claw 14 (FIG. 4) will seat in notch 24 formed integrally with side rail 25 of backing strip 15. Essentially, therefore, the claw 14 and notch 24 act as a keeper and notch, respectively. The foregoing action is possible because claw 14 will slide up the inclined surface 26 of side portion 27 of notch 24 until such time as it drops within the notch. After claw 14 is seated in notch 24 as shown in FIGS. 1 and 4, the backing strip 15 which securely mounts the wiping element 16 thereon will be held against lengthwise movement relative to pressure equalizer 12 in both directions. As can be seen from FIGS. 4 and 5, side 28 of notch 24 is formed to lie in substantially the same plane as the side rail 25 of backing strip 15. However, side portion 27 of notch 24 is bent downwardly to insure a good locking contact with claw 14. After the foregoing assembly has been effected, the upper pressure equalizer 11 is slid onto the end 29 (FIG. 1) of the refill unit 22 and thereafter the upper end 30 of the pressure equalizer 10 is latched into engagement with the pressure equalizer 11 as fully taught in the above-noted Patent No. 2,667,656.

If it is desired to disassemble the refill unit 22 from the superstructure consisting of yoke 10 and pressure equalizers 11 and 12, it is only necessary to disengage equalizer 11 from yoke 10. Thereafter the opposite side rails 25 of the backing strip 15 are grasped in the vicinity of notch 24 and twisted as a unit in a clockwise direction as seen from FIG. 4, or in a counterclockwise direction as viewed from FIG. 5. The side rails are relatively flexible in this area because of the enlargement 31 of slot 32 in the backing strip. The foregoing twisting movement will cause side 27 of notch 24 to move upwardly out of alignment with claw 14 to permit the backing strip 15 to be moved longitudinally relative to claw 14 of the yoke. Thereafter continued longitudinal movement of the backing strip 15 to the left (FIGS. 1 and 4) will permit complete disengagement between the refill unit 22 and the superstructure. It will be appreciated, of course, that the wiping element 16 normally deteriorates with usage and that the replacement thereof from time to time must be effected in order to cause the wiper to wipe properly.

Another feature of the present invention resides in the increased flexibility of the wiper element 16 at the central portion thereof to permit it to conform readily to areas of various curvature of a curved windshield. To this end head 17 has a notch 33 (FIGS. 1, 7, and 8) formed therein. This notch actually causes the head 17 to be discontinuous or cut away to permit the wiping element 16 to be more flexible in such cut away area. Notch 33 assumes the position shown in FIG. 7 when the wiper is on a relatively flat portion of the windshield 21. The notch 33, however, assumes the position shown in FIG. 8 when the wiper 16 is on a relatively curved portion of the windshield. It can readily be seen that the presence of notch 33 obviates the tensile resistance to flexure which would otherwise be provided if the head 17 were not so cut away to form notch 33. In other words, the notch 33 causes the wiping element to be more flexible in the areas where it is located to thereby permit it to conform more easily to areas of varying curvature of a curved windshield.

However, the backing strip 15 has its opposite side rails 25 connected to each other by a cross brace 34 which is formed integrally with said side rails. Because of the existence of cross brace 34, the opposite side rails 25 cannot move relative to each other in an up and down manner in the area where cross brace 34 is located, as can be seen from FIG. 9. Thus the cross brace 34 stabilizes the side rails and causes said side rails to provide a greater support to the wiping element 17 which is made more flexible because it possesses the notch 33. However, since the cross brace 34 is located in a relatively small area of the backing strip, it does not add enough rigidity thereto to overcome the increased flexibility of the wiping element at notch 33. The net result, therefore, is that the refill unit 22 in the region of notch 33 is more flexible than conventional types of assemblies and notwithstanding this increased flexibility has greater wiping stability to cause the wiping element to remain in good wiping engagement with the windshield. Expressed functionally a wiper of the foregoing construction is more flexible to conform more readily to varying areas of curvature of a windshield while also possessing increased stability to maintain it in good wiping contact. The stabilizing function of cross brace 34 can all the more be appreciated when FIG. 9 is compared with FIG. 10, which illustrates conventional structure of a backing strip not having the cross brace. In such structure the side rails 25' move up and down relative to each other as the wiper element 16' traverses the windshield and permits wiping lip 20' to lay over excessively so that the wiping edge of said lip is not in optimum contact with the windshield, the foregoing tending to cause undesirable smear due to excessive wiper layover. Furthermore, the separation of the side rails 25' at the central unsupported span ofttimes permits the head 17' to be pulled from between side rails 25'.

The manner of threading the wiping element 16 into the backing strip 15 is shown in FIG. 6. The backing strip 15 has windows 35 and 36 therein (FIG. 2). First of all the portion of head 17 adjacent notch 33 is threaded into window 35 and thereafter the end of head 17 adjacent end 29 of the wiping element is threaded into window 36. After both of these threading operations the neck 19 between head 17 and central body portion 18 of the wipers lies within slot 32 and slot 37. Thereafter the ends of the head portion 17 which protrude above the backing strip (FIG. 6) are grasped by a suitable tool or by hand and both of these portions of the wiping element are moved longitudinally relative to the backing strip until such time that notch 33 lies under cross brace 34 at which time the refill unit consisting of wiping element 16 and backing strip 15 will assume the position shown in FIG. 2. It will be appreciated that since window 35 is not located at the end of slot 32, the end of the wiper elements will have to be compressed to cause it to fit into the longer portion of slot 32 and after the wiping element is released it will spring back so that the end thereof lies in slot 32′ which is located on the opposite side of window 35 than slot 32. The foregoing feature is fully set forth in Patent No. 2,697,241 issued to John R. Oishei. After the wiping element 16 is completely assembled on backing strip 15, neck 19 will lie within slots 32′, 32, and 37.

It is to be noted that the sides of the neck 19 adjacent notch 33 are in substantial abutting relationship with cross brace 34. Thus the cross brace serves as a stop for the central portion of the wiper element to thereby prevent the entire wiper element from tending to become compressed throughout its length and thereby form wrinkles in the wiping edge which would destroy the good wipe qualities. In other words, cross brace 34 also acts as an abutment to divide the wiping element into a series of increments thereby obviating the cumulative compression which might otherwise be experienced throughout the length of the wiper which would cause the wiping edge to become undesirably distorted.

It is further noted that the side rails 25 of backing strip 15 are connected at their ends by integral end portions 38. Thus the entire backing strip can be formed in a simple stamping operation, which is relatively economical.

While a preferred embodiment of the present invention has been disclosed, it is to be understood that the present invention is not to be limited thereto, but may be otherwise embodied within the scope of the following claims.

What is claimed is:

1. A windshield wiper comprising a primary yoke, first and second pressure equalizers, pivotal connections between the outer ends of said primary yoke and central portions of said first and second pressure equalizers, means associated with one end of said primary yoke and said first pressure equalizer to permit said first pressure equalizer to be detached from said primary yoke, a backing strip, means on the ends of said first and second pressure equalizers located inwardly and outwardly of said pivotal connections for engaging select spaced areas of said backing strip, a wiping element mounted on said backing strip, and notch means extending laterally from the edge of said backing strip for receiving said means on the inward end of said second pressure equalizer, said backing strip including slot means extending longitudinally thereof for receiving said wiping element and wherein said longitudinal slot means possesses an enlarged portion in the area of said notch means, whereby said backing strip can be attached to said pressure equalizer by a relative sliding movement when said first pressure equalizer is detached from said primary yoke.

2. A windshield wiper comprising a superstructure, a backing strip, a wiping element, means mounting said backing strip on said superstructure, said backing strip comprising a substantially planar member having a longitudinal slot therein with side rails on opposite sides of said slot for supporting said wiping element, and a cross brace formed integrally with and joining said side rails, said cross brace lying in substantially the same plane as said side rails and bracing the central portion of said side rails against substantial relative movement with respect to each other to thereby stabilize said backing strip at the central portion thereof, said wiping element comprising a central body portion having a wiping lip depending therefrom, a head portion attached to said body portion, said head portion lying to one side of said backing strip and said central body portion lying on the other side of said backing strip, said head portion being discontinuous in the vicinity of said cross brace to thereby increase the flexibility of said wiping element in said vicinity.

3. A backing strip for a windshield wiper comprising an elongated member having a longitudinal slot therein with side rails on opposite sides of said slot, and a cross brace formed integrally with and joining said side rails intermediate the ends thereof, said cross brace lying in substantially the same plane as said side rails and bracing said side rails against substantial relative movement with respect to each other in the area of said brace to thereby lend stability to said backing strip, said cross brace dividing said longitudinal slot into a plurality of longitudinal slots, and window means of greater width than said longitudinal slots associated with each of said longitudinal slots for receiving a wiping element during an assembling operation.

4. A backing strip for a windshield wiper comprising an elongated member having a longitudinal slot therein with side rails on opposite sides of said slot, and a cross brace formed integrally with and joining said side rails intermediate the ends thereof, said cross brace lying in substantially the same plane as said side rails and bracing said side rails against substantial relative movement with respect to each other in the area of said brace to thereby lend stability to said backing strip, said backing strip including a notch extending laterally from said side rails, a portion of said longitudinal slot proximate said notch being of greater width than the portions of said longitudinal slot adjacent thereto to thereby permit increased flexure of said backing strip in the vicinity of said notch when a twisting force is applied to said backing strip.

5. A windshield wiper refill unit comprising a backing strip having spaced side rail portions defining a longitudinal slot therebetween, a cross brace located substantially centrally of said backing strip and being formed integrally with said spaced side portions and joining said spaced side portions, said cross brace lying in substantially the same plane as said side portions, a wiping element mounted on said backing strip, said wiping element having a central body portion positioned to one side of said backing strip and a mounting head portion positioned on the opposite side of said backing strip, a neck portion connecting said mounting head portion to said central body portion, a wiping lip operatively attached to said central body portion, said mounting head portion being discontinuous in the area thereof adjacent said cross brace to permit said wiping element to possess greater flexibility in said area of said cross brace forming a recess for engagement with said cross brace, said cross brace preventing excessive relative movement between said side rail portions of said backing strip in the area of said discontinuous portion of said mounting head to thereby cause said backing strip to provide stabilizing support to said wiping element at the portion thereof which is cut away and to limit longitudinal movement of said wiping element relative to said backing strip.

6. A windshield wiper refill unit comprising a backing strip having side rail portions defining a longitudinal slot therebetween, a wiper element mounted on said backing strip with a first portion thereof including a wiping lip mounted to one side of said backing strip and a second portion thereof including a mounting head portion located on the other side of said backing strip, and notch means extending laterally from said backing strip remote from the ends of said backing strip, said notch means being closer to the center of said backing strip than to the end thereof, said notch means having side portions adjacent thereto which cause said backing strip to have a greater width in the area of said side portions of said backing strip than in the portions of said backing strip adjacent to said side portions, said side rail portions of said backing strip being joined by a rigidly securement cross brace lying in substantially the same plane as said side rail portions, said mounting head portion of said wiping element being discontinuous in the area of said cross brace and forming a recess for engagement with said cross brace to thereby permit increased flexibility of said wiping element in the vicinity of said cross brace and to limit longitudinal movement between the wping element and the backing strip, said cross brace preventing excessive relative movement between said side rail portions of said backing strip to thereby lend firm support to said wiping element in its area of increased flexibility.

References Cited in the file of this patent

UNITED STATES PATENTS

| | | |
|---|---|---|
| 2,687,544 | Scinta | Aug. 31, 1954 |
| 2,706,305 | Oishei | Apr. 19, 1955 |
| 2,948,011 | Krohm | Aug. 9, 1960 |
| 3,035,298 | Scinta | May 22, 1962 |

FOREIGN PATENTS

| | | |
|---|---|---|
| 1,045,263 | Germany | Nov. 27, 1958 |
| 1,237,692 | France | June 20, 1960 |